April 22, 1969           W. G. WING           3,439,556

ROTARY TRANSFORMER FOR TRANSMITTING ELECTRICAL SIGNALS

Filed July 21, 1965

INVENTOR.
WILLIS G. WING
BY
*H. Terry*
ATTORNEY

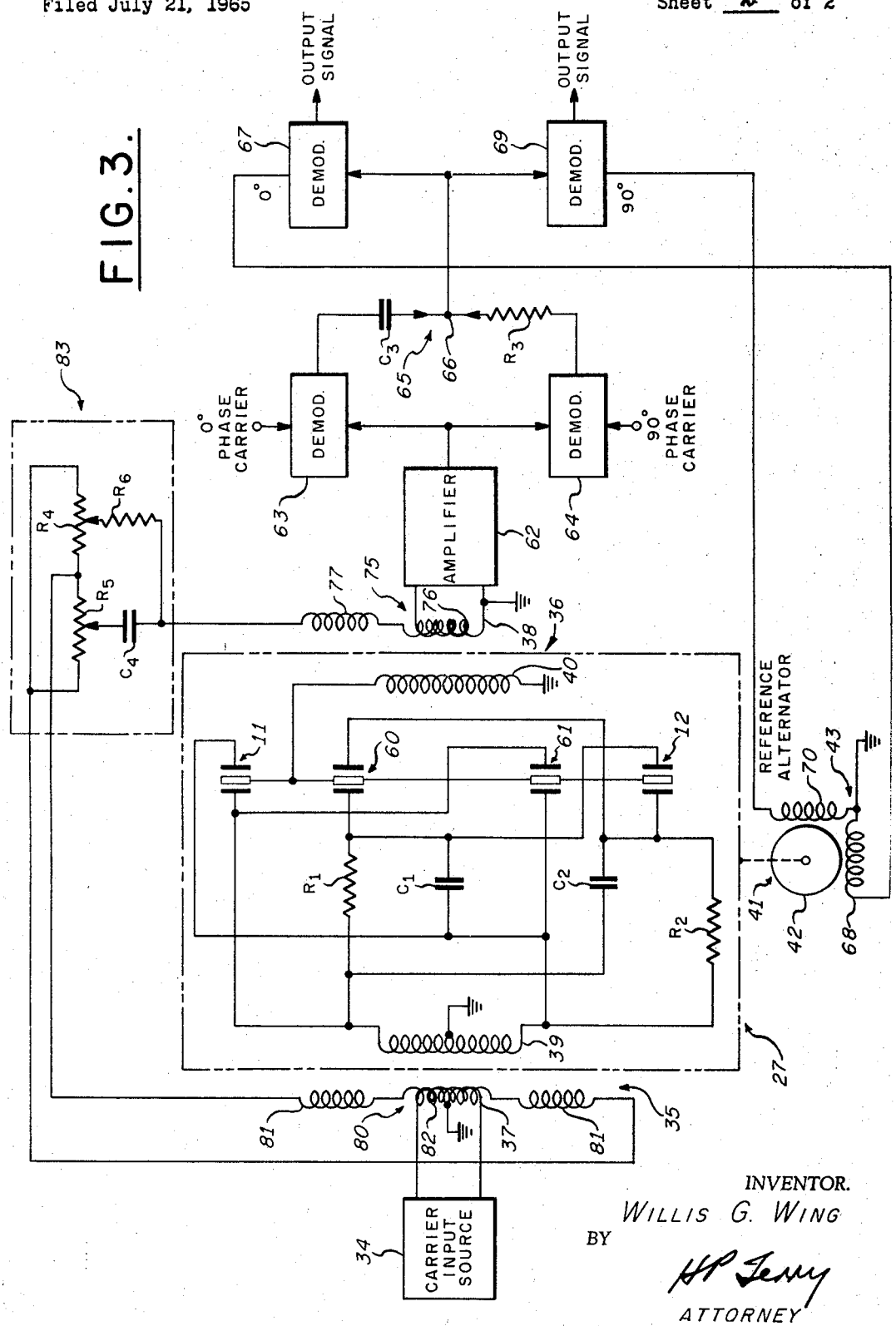

United States Patent Office 3,439,556
Patented Apr. 22, 1969

3,439,556
ROTARY TRANSFORMER FOR TRANSMITTING ELECTRICAL SIGNALS
Willis G. Wing, Glen Head, N.Y., assignor to Sperry Rand Corporation, a corporation of Delaware
Original application July 21, 1965, Ser. No. 473,771. Divided and this application July 13, 1967, Ser. No. 653,111
Int. Cl. G01c 19/28
U.S. Cl. 74—5.6                     7 Claims

ABSTRACT OF THE DISCLOSURE

An inertial device having a stationary member and a pick-off mounted on a rotating member. Rotary transformer means are mounted on the stationary and rotating member. Tertiary winding means having two parts are coupled to the winding of the stationary member in such a manner as to compensate for undesirable modulation in the output signal of the rotary transformer means.

---

The invention herein described was made in the course of or under a contract or subcontract thereunder, with the Department of the Navy.

Cross-reference to related application

The present invention is a divisional application of U.S. Patent application Ser. No. 473,771 entitled, "Compensation Apparatus for Inertial Devices," in the name of Willis G. Wing and filed July 21, 1965.

BACKGROUND OF THE INVENTION

Field of the invention

The present invention is concerned with compensating for undesirable effects in inductive devices associated with gyroscopic and other apparatus having relatively moving parts.

Description of the prior art

A gyroscope having a rotating sensitive element in the form of a fluid sphere is disclosed in my U.S. Patent No. 3,058,359 entitled, "Fluid Rotor Gyroscopic Apparatus," issued Oct. 16, 1962, and assigned to the same assignee as the present invention. In said U.S. Patent 3,058,359, the fluid rotor gyroscope is discussed in terms of the differential pressure created between points at the surface of a body of liquid contained in a substantially spherical cavity when this fluid body is spun by means of spinning its containing cavity and under the conditions where the spin axis of the cavity is not parallel to the spin axis of the fluid body. As disclosed in that patent, the resultant pressure is due to centrifugal effects within the fluid body and the differential pressure can be sensed by pressure transducers placed in passages which communicate with the cavity at the points where it is desired to sense the pressure.

It has been determined that additional pressures are created in the passages which connect the pressure transducers to the sensing ports which add to the aforementioned centrifugally produced pressure and are thus also sensed by the pressure transducers. These additional pressures have as their sources the effects of angular acceleration of the device and angular velocity of the device (both about axes in the plane normal to the spin axis).

It has been found that the pressure created due to angular acceleration of the gyroscope can be highly objectionable in certain applications but that proper design of the passages can effectively eliminate this pressure.

It has further been found that proper proportioning of the passages can be provided which greatly attenuates drift error which can result from angular vibration at twice spin frequency.

Both of these desirable results cannot be completely achieved simultaneously in the design of a passage but the designs are similar and the option exists to proportion the passages optimally for a particular application as fully explained in said patent application S.N. 473,771. However, the proper design for elimination of the angular acceleration effect markedly improves the error due to angular vibration at twice spin frequency and the proper design for elimination of error due to angular vibration at twice spin frequency markedly reduces the response to angular acceleration. In the event a design is chosen to eliminate the response to angular acceleration, provisions can be made to further reduce the error due to angular vibration at twice spin frequency by appropriate processing of the electrical signal in accordance with the present invention.

As disclosed in said U.S. Patent No. 3,058,359, the fluid rotor gyroscope also utilizes magnetic rotary transformers or magnetic slip rings of the type shown in U.S. Patent No. 2,432,982 issued Dec. 23, 1947 to F. D. Braddon et al. entitled "Inductive Coupling."

The rotary transformers carry high frequency (10 kc. to 40 kc.) excitation for the pressure transducers from the non-rotating frame to the rotating member and bring the signal from the rotating member to the frame. The signal which is developed on the rotating member is a spin frequency modulation of the high frequency carrier (commonly, it is a single side band, suppressed carrier signal). An error results if any similar voltage is developed for any cause other than the effect of the alternating pressure acting on the transducer diaphragms.

One error comes from modulation of any unsuppressed carrier by the output rotary transformer at spin frequency or modulation of the input carrier by the input rotary transformer; either of these can result in a signal which is indistinguishable from the normal signal and, hence, a source of drift error. Modulation by the rotary transformers can occur either because the coupling coefficient between stator and rotor varies with angle or because the input impedance varies with angle; in the latter case modulation will occur only if there is a non-zero source impedance for the input to the particular transformer.

One possible solution to this problem would be very accurate balancing of the bridge circuits of the pressure transducers. Such balancing completely suppresses the carrier so that no false signal results due to modulation in the output transformer (only harmonic distortion of the signal would result) and any modulation of the carrier by the input transformer is also eliminated by this accurate bridge balance. However, it is very difficult to obtain the required quality of electrical balance on the rotating assembly, and it is even more difficult to retain such balance if actually achieved.

Summary of the invention

The present invention utilizes additional circuit elements with respect to the rotary transformer on the stator and achieves the same result as if perfect balance existed on the rotor. This is accomplished by utilizing a tertiary winding having two parts, one part being tightly coupled such as by means of a bifilar coil and another part being loosely coupled with the two parts being connected to oppose each other. This provides compensation for the undesirable effects associated with the rotary transformers.

Brief description of the drawings

These and other objects of the present invention will become apparent by referring to the drawings wherein like reference numerals indicate like elements.

FIG. 3 is an electrical schematic wiring diagram of the fluid rotor gyroscope incorporating the present invention.

Description of the preferred embodiment

Figure 1:
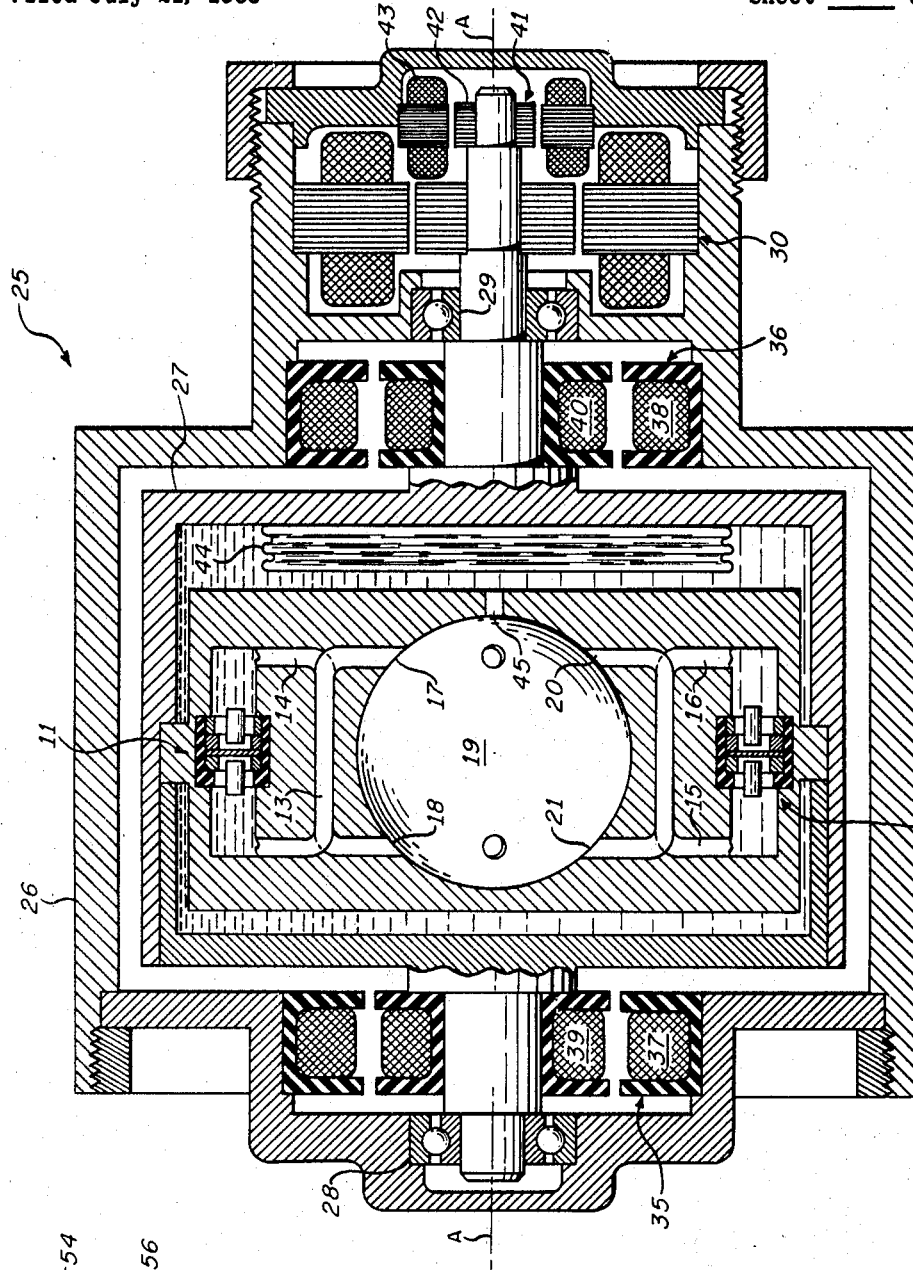
FIG. 1 is a cross-sectional view of a fluid rotor gyroscope incorporating the present invention.

Referring now to FIG. 1, a cross-section of one embodiment of a fluid rotor gyroscope 25 incorporating the present invention is shown. The gyroscope 25 has a stationary housing 26 within which is a rotatable assembly 27 carried on bearings 28 and 29 for rotation about a spin axis A—A by a motor 30 which is preferably a polyphase induction or hysteresis motor. Rotary transformers 35 and 36 have their respective stators 37 and 38 mounted on the stationary housing 26 and their respective rotors 39 and 40 mounted on the rotatable assembly 27. The rotary transformers 35 and 36 may be generally of the type disclosed in U.S. Patent No. 2,432,982, issued Dec. 23, 1947 to F. D. Braddon et al. entitled "Inductive Coupling." An electromagnetic alternator 41 is provided having its permanent magnet rotor 42 mounted on the rotatable assembly 27 and its stator 43 mounted on the stationary housing 26.

Within the rotatable assembly 27 is the essentially spherical cavity 19 which communicates with opposite sides of the pressure transducer 11 through tubes or passages 13 and 14 via ports 17 and 18 respectively. The cavity 19 also communicates with opposite sides of the pressure transducer 12 through tubes or passages 15 and 16 via ports 20 and 21 respectively. Not shown in FIG. 1 are two additional pressure transducers and connecting passages, each displaced 90° from those shown. The tubes such as 13 and 14 connected to a transducer such as 11 in combination define a figure 8 configuration for the reasons explained in said parent application S.N. 473,771.

Also mounted on the rotatable assembly 27 is a fluid expansion bellows 44 which communicates with the cavity 19 through a passage 45.

Figure 2A:
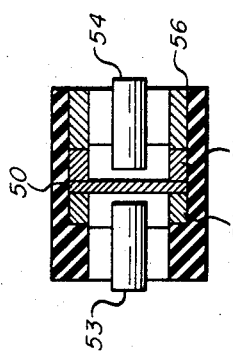
FIGS. 2a and 2b are enlarged views showing a typical pressure transducer.
Figure 2B:
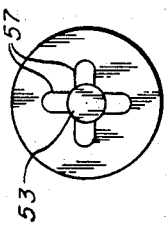

A typical transducer such as 11 is shown enlarged in FIGS. 2a and b. The transducer 11 consists of a thin metallic diaphragm 50 connected between mounting rings 51 and 52, metallic rods 53 and 54 which serve as stationary plates and an electrical insulating member 56 which holds the other parts in proper relationship. The device is essentially a capacitive microphone which operates on variations in the capacitance between the diaphragm 50 and stator 53 and that between the diaphragm 50 and stator 54 when motion of the diaphragm 50 occurs due to differential pressures in the fluid filled cavity 19. FIG. 2b shows typical apertures 57 through which fluid passes.

Referring now to FIG. 3, an embodiment of the electrical circuit associated with the improved fluid rotor gyroscope of the present invention is shown. A source 34 of alternating voltage at a relatively high frequency (for instance 10 kc.) is applied to the portions of the circuit on the rotatable assembly 27 by the rotary transformer 35. The alternating voltage from the rotary transformer 35 is applied directly to the stator plates of the pressure transducers 11 and 12 and to the two remaining transducers 60 and 61 which are at 90° to transducers 11 and 12 through lattice networks comprised of resistor $R_1$, resistor $R_2$, capacitor $C_1$ and capacitor $C_2$ which provide an electrical phase shift of 90°. The outputs of all four transducers 11, 12, 60 and 61 are summed and applied to the rotor coil 40 of the rotary transformer 36. The output of the rotary transformer 36 from its stator coil 38 is applied to the input of an amplifier 62. With the circuit shown the variations in the amplitude of the zero angle phase of the high frequency voltage from the amplifier 62 are representative of the sum of the pressure variations acting on the transducers 11 and 12 while the variations in the amplitude of the 90° angle phase of the high frequency voltage from amplifier 62 are representative of the sum of the pressure variations acting on the transducers 60 and 61 located at 90° to transducers 11 and 12. The output of a phase sensitive demodulator 63 connected to be responsive to the output of amplifier 62 and 0° phase carrier signals is then a voltage representative of the sum of the pressure variations acting on transducers 11 and 12. The output of a phase sensitive demodulator 64 connected to be responsive to the output of amplifier 62 and 90° phase carrier signals is a voltage representative of the sum of the pressure variations acting on the transducers 60 and 61.

When the gyroscope 25 is in operation and is subjected to an input movement, the outputs of the demodulators 63 and 64 will be voltages varying at spin frequency and relatively in quadrature phase. As discussed above and in said parent application S.N. 473,771, the phase rotation will have one sense for a steady input and the opposite sense for the undesirable output resulting from an angular vibration input at twice spin frequency.

A summing network 65 connected to the demodulators 63 and 64 consisting of capacitor $C_3$ and resistor $R_3$ uses values so chosen as to make $\Omega R_3 C_3 = 1$. With this relationship the voltage at the junction 66 thereof will be the sum of the two demodulator outputs for one phase rotation and the difference between the two demodulator outputs for the opposite phase rotation. It is thus possible to discriminate against outputs resulting from angular vibration at twice spin frequency.

The voltage at the junction 66 of resistor $R_3$ and capacitor $C_3$ will be of the form $$E = K\delta \sin(\Omega t + \phi)$$

If $\phi$ is set equal to zero, this is the output resulting from input movement about one axis normal to the spin axis A—A, there will then be a corresponding DC output signal from a phase sensitive demodulator 67 connected to the junction 66 and to the 0° phase winding 68 of the reference alternator 41. If $\phi$ is set equal to 90°, this is the output resulting from input movement about an axis normal to the spin axis A—A and the above discussed input axis; there will, then, be a corresponding DC output signal from a phase sensitive demodulator 69 connected to the junction 66 and to the 90° phase winding 70 of the reference alternator 41.

As explained above, errors may also be introduced due to the rotary transformer or magnetic slip ring operation. Compensation for these errors is effected by means of utilizing additional circuit elements on the stator in a manner to be described.

The modulation in the output rotary transformer 36 involves magnetic flux in the air gap so that any means by which the air gap flux can be nulled will prevent this undesired modulation. It is equally effective to null the flux by a change in the magnetomotive force (MMF) on the rotor 40 or on the stator 38. Thus, a tertiary winding 75 can be added to the stator 38 and a current established in this winding which is correct in phase and amplitude to produce an MMF which exactly cancels the MMF due to current in the rotor coil 40 so that the net MMF across the air gap is reduced to zero. The only difficulty with this procedure results from leakage coupling between the tertiary winding 75 and the signal output coil 38. There are two potentially undesirable effects from this leakage coupling; first, there will be a steady carrier voltage out of the transformer 36 which may saturate the electronic amplifier 62 and second, there is no basis for the user to adjust the current to the correct value to null the flux.

The present invention solves both of these problems when the tertiary winding 75 is so designed as to reduce the leakage coupling between it and the signal output coil 38 to zero. This can be accomplished by making the tertiary winding 75 in two parts, one part 76 coupled as tightly as possible to the output winding 38 (for example, wound as a bfilar coil) and a second part 77 as loosely coupled as possible with these two parts connected to make them oppose with respect to each other. When the bifilar winding 76 has substantially less turns than the loosely coupled winding 77, the over-all winding 75 can have zero leakage coupling to the output coil 38 and yet retain the ability to change the MMF across the air gap. Furthermore, when the design is such as to make the leakage coupling zero, the output voltage will be equal to zero when the air gap flux is zero. Both of the desired conditions are then simultaneously obtained.

The above discussed design can be made to eliminate completely the effect of modulation in the output rotary transformer 36 by, in effect, providing for the final balancing of the transducer bridge circuit by use of circuit elements on the stator 38.

When modulation of the bridge excitation by the input rotary transformer 35 is considered, however, it is found that this is only a partial solution. To the extent that the input is modulated because of variations in input current acting on a non-zero source impedance, the correction as described is complete because both the rotating and non-rotating bridge elements are excited by the resultingly modulated voltage. If the input rotary transformer 35 modulates its secondary voltage for other reasons, however, there is no correction for this in the above discussed arrangement.

To reduce further the effect of the input rotary transformer 35, a tertiary winding 80 can also be included on its stator 37. As in the case of the output transformer tertiary winding 75, the winding 80 is made in a loosely coupled section 81 and a tightly coupled section 82 which are connected in series opposition with respect to each other to produce a net zero leakage coupling to the excited stator coil 37. The voltage on this tertiary winding 80 will be modulated almost exactly as is the rotor winding 39 no matter what the source of the modulation. Use of the resulting voltage to excite the external bridge elements of a bridge circuit 83 and adjustment of the bridge circuit 83 to produce a null output voltage at the output rotary transformer 36 will substantially eliminate all undesirable rotary transformer contributions to the bias of the gyroscope 25. The bridge circuit 83 comprises variable resistors $R_4$ and $R_5$ responsive to the output of the tertiary winding 80 which form two arms of the bridge circuit 83 and a resistor $R_6$ and a capacitor $C_4$ which form the remaining arms. The resistor $R_6$ and capacitor $C_4$ each have one terminal connected to the wiper arms of the respective variable resistors $R_4$ and $R_5$ and the other terminal connected together and to the tertiary winding 75 to form an adjustable RC network for nulling undesirable output voltages as explained above.

While the invention has been described in its preferred embodiment, it is to be understood that the words which have been used are words of description rather than of limitation and that changes within the purview of the appended claims may be made without departing from the true scope and spirit of the invention in its broader aspects.

I claim:
1. In a device having a stationary member and a rotating member,
   (a) rotary transformer means having a primary winding mounted on one of said members and adapted to be responsive to an input signal and a cooperative secondary winding mounted on the other of said members tending to exhibit an undesirable modulation during relative rotation thereof, and
   (b) tertiary winding means having a first part tightly coupled to the winding on said stationary member and a second part loosely coupled to said winding on said stationary member with said first and second parts connected in series opposition with respect to each other for compensating for said undesirable modulation in the output signal of said rotary transformer means.

2. In a device having a stationary member and a rotating member,
   (a) input rotary transformer means having a primary winding mounted on said stationary member and adapted to be responsive to an input signal and a cooperative secondary winding mounted on said rotating member,
   (b) output rotary transformer means having a primary winding mounted on said rotating member and adapted to be responsive to an input signal and a cooperative secondary winding on the stationary winding, and
   (c) tertiary winding means having a first part tightly coupled to a winding on said stationary member and a second part loosely coupled to said winding on said stationary member with said first and second parts connected in series opposition with respect to each other for compensating for the effects of undesirable modulation in the output signal of said rotary transformer.

3. In a device of the character described in claim 2 in which said tertiary winding means includes a first tertiary winding coupled with said input rotary transformer primary winding and a second tertiary winding coupled with said output rotary transformer secondary winding.

4. In a device of the character described in claim 2 in which said tertiary winding means includes a first tertiary winding coupled with said input rotary transformer primary winding and a second tertiary winding coupled with said output rotary transformer secondary winding and further including an adjustable network connected between said first tertiary winding and said second tertiary winding for producing a null output voltage at the output of said output rotary transformer for compensating for undesirable rotary transformer effects.

5. In an inertial device having a stationary member and a rotating member with pick-off means mounted on said rotating member,
   (a) an input rotary transformer having a primary winding mounted on said stationary member and adapted to be responsive to an input signal and a cooperative secondary winding mounted on said rotating member and connected to said pick-off means,
   (b) an output rotary transformer having a primary winding mounted on said rotating member and connected to said pick-off means and a cooperative secondary winding on the stationary winding for providing an output signal, and
   (c) tertiary winding means having a first part tightly coupled to a winding on said stationary member and a second part loosely coupled to said winding on said stationary member with said first and second parts connected in series opposition with respect to each other for compensating for the effect of undesirable modulation in said output signal.

6. In a device of the character described in claim 3 in which said tertiary winding means includes a first tertiary winding coupled with said input rotary transformer primary winding and a second tertiary winding coupled with said output rotary transformer secondary winding.

7. In a device of the character described in claim 5 in which said tertiary winding means includes a first tertiary winding coupled with said input rotary transformer primary winding and a second tertiary winding coupled with said output rotary transformer secondary winding and further including an adjustable network connected to be responsive to said first tertiary winding and to said second tertiary winding for producing a null voltage for compensating for undesirable rotary transformer effects.

References Cited

UNITED STATES PATENTS

| | | | |
|---|---|---|---|
| 3,085,192 | 4/1963 | Maier | 323—51 |
| 3,200,653 | 8/1965 | Wing | 74—5.6 |
| 3,260,122 | 7/1966 | Rocks | 74—5.6 |
| 3,347,105 | 10/1967 | Polushkin et al. | 74—5.6 |
| 3,351,850 | 11/1967 | Crawford et al. | 323—51 |

FRED C. MATTERN, Jr., *Primary Examiner.*

MANUEL ANTONAKAS, *Assistant Examiner.*

U.S Cl. X.R.

323—51